United States Patent
Suzuki (10) Patent No.: US 7,729,080 B2
(45) Date of Patent: Jun. 1, 2010

(54) HEAD CONTROL APPARATUS, HEAD CONTROL METHOD, AND MAGNETIC DISK APPARATUS

(75) Inventor: Hiroshi Suzuki, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 0 days.

(21) Appl. No.: 12/391,931

(22) Filed: Feb. 24, 2009

(65) Prior Publication Data

US 2009/0310247 A1 Dec. 17, 2009

(30) Foreign Application Priority Data

Jun. 12, 2008 (JP) ............... 2008-154258

(51) Int. Cl.
*G11B 21/02* (2006.01)
*G11B 27/36* (2006.01)

(52) U.S. Cl. .......................... 360/75; 360/31

(58) Field of Classification Search ............... None
See application file for complete search history.

(56) References Cited

U.S. PATENT DOCUMENTS

| 7,079,337 B2 | 7/2006 | Tokizono et al. |
| 7,385,778 B2 | 6/2008 | Kakiki |
| 2007/0268615 A1* | 11/2007 | McFadyen et al. ............. 360/75 |
| 2009/0122444 A1* | 5/2009 | Ma et al. .................. 360/97.02 |
| 2009/0141390 A1* | 6/2009 | Oyamada et al. .............. 360/75 |

FOREIGN PATENT DOCUMENTS

| JP | A 1-100779 | 4/1989 |
| JP | A 2005-141798 | 6/2005 |
| JP | A 2005-158088 | 6/2005 |
| JP | A 2007-310957 | 11/2007 |

* cited by examiner

*Primary Examiner*—Andrew L Sniezek
(74) *Attorney, Agent, or Firm*—Greer, Burns & Crain, Ltd.

(57) ABSTRACT

There is provided a head control apparatus that controls the flying height of a head with respect to a disk by controlling heater current supplied to a heater for head protrusion adjustment. The head control apparatus includes: an acquisition section that acquires flying height information which is information concerning a variation in the flying height of the head; a determination section that determines whether the flying height variation is caused by a variation in atmospheric pressure based on a measured temperature and the flying height information acquired by the acquisition section; and a control section that controls, in the case where the determination section has determined that the flying height variation is caused by a variation in atmospheric pressure, heater current based on control information corresponding to the flying height variation caused by the atmospheric pressure variation.

19 Claims, 9 Drawing Sheets

HEAD CONTROL APPARATUS, HEAD CONTROL METHOD, AND MAGNETIC DISK APPARATUS

CROSS-REFERENCE TO RELATED APPLICATIONS

This application is based upon and claims the benefit of priority of the prior Japanese Patent Application No. 2008-154258, filed on Jun. 12, 2008, the entire contents of which are incorporated herein by reference.

FIELD

The embodiment discussed herein is related to a head control apparatus, a head control method, and a magnetic disk apparatus that control the height of a head with respect to a disk.

BACKGROUND

With a recent reduction in size and an increase in capacity, a magnetic disk apparatus has become available for portable use and, accordingly, resistance to environmental conditions such as vibration and impact, temperature, and atmospheric pressure is required to be improved.

In order to increase a mechanical strength of a magnetic disk apparatus under a reduced pressure, conventionally the air-bearing shape of a slider has been improved or parameters of a suspension spring pressure have been optimized.

Further, in recent years, as a technique for responding to a reduction in the flying height of a head, there is available a technique of setting the flying height to a desired height by using a heater provided near a read/write element positioned at the end of a head slider.

As a conventional art relating to the present invention, there are known the following apparatuses: a control apparatus that checks a change in the flying height caused due to a difference in atmospheric pressure by detecting a data error rate to thereby control a heater; a magnetic recording apparatus that controls the flying height in association with temperature; and a magnetic recording apparatus that checks an abnormal flying height by detecting the output of a head (refer, e.g., to Patent Document 1: Japanese Laid-open Patent Publication No. 2007-310957, Patent Document 2: Japanese Laid-open Patent Publication No. 2005-158088, and Patent Document 3: Japanese Laid-open Patent Publication No. 2005-141798).

With an enlargement of application of a magnetic disk apparatus, the level of a market demand in terms of a reduced pressure condition has become higher. Concretely, reduced pressure condition corresponding to an altitude of 4000 m to 5000 m class (conventionally, 3000 m) is required. Therefore, the reduced pressure resistance of a magnetic disk apparatus needs to be improved. Further, at the same time, with an increase in recording density of the magnetic disk apparatus, the flying height of a head slider needs to be reduced. Considering production variations including relative height between the slider and disk or disk flatness, it has become difficult to respond to a change in the flying height caused due to a reduction in pressure by improving the air-bearing shape of the slider.

Further, in order to ensure reliability of the magnetic disk apparatus, a crucial failure such as occurrence of scratches on the surface of a disk or occurrence of stiction between the head and disk due to a reduction in the flying height of the slider under a reduced pressure needs to be avoided.

SUMMARY

According to an aspect of the present invention, there is provided a head control apparatus that controls the flying height of a head with respect to a disk by controlling heater current supplied to a heater for head protrusion adjustment, including: an acquisition section that acquires flying height information concerning a variation in the flying height of the head; a determination section that determines whether the flying height variation is caused by a variation in atmospheric pressure based on a measured temperature and the flying height information acquired by the acquisition section; and a control section that controls, in the case where the determination section has determined that the flying height variation is caused by a variation in atmospheric pressure, heater current based on control information corresponding to the flying height variation caused by the atmospheric pressure variation.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

An embodiment of the present invention will be described below with reference to the accompanying drawing.

An electrical configuration of a Hard Disk Drive (HDD) according to the present embodiment will be described below.

Figure 1:
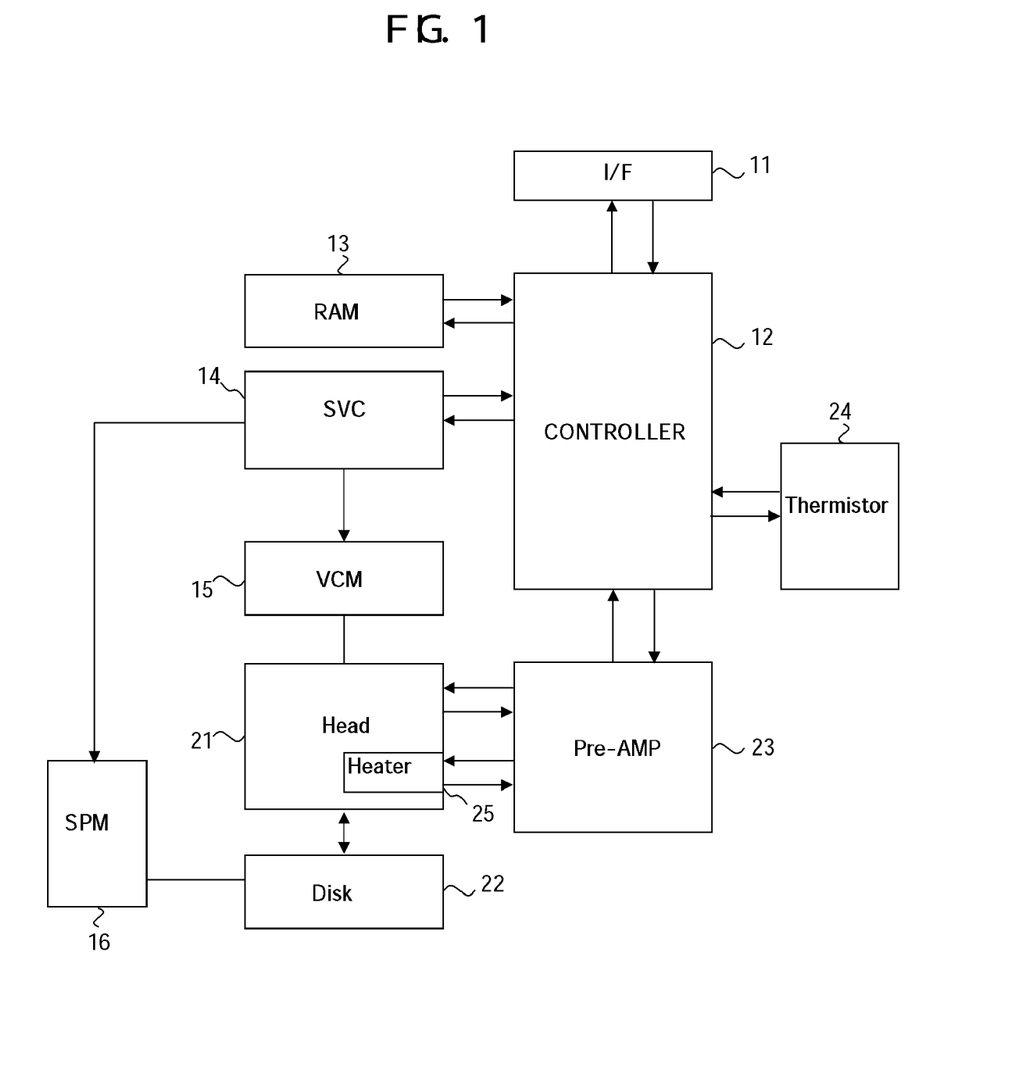
FIG. 1 is a block diagram illustrating an example of an electrical configuration of an HDD according to an embodiment of the present invention.

FIG. 1 is a block diagram illustrating an example of an electrical configuration of the HDD according to the present embodiment. An HDD 1 according to the present embodiment includes a host interface (I/F) 11, a controller 12, a Random Access Memory (RAM) 13, a Servo Combo (SVC) 14, a Voice Coil Motor (VCM) 15, a Spindle Motor (SPM) 16, a head 21, a disk (media) 22, a preamplifier 23, a thermistor 24, and a heater 25.

The host interface 11 is connected to an external host. The controller 12 performs communication with the host interface 11, issuance of an instruction to the SVC 14, demodulation of a read signal from the preamplifier 23, and modulation of a write signal to be sent to the preamplifier 23. The RAM 13 is a data buffer. The SVC 14 controls the VCM 15 and SPM 16 according to an instruction from the controller 12. The VCM 15 moves the head 21. The SPM 16 rotates the disk 22. The head 21 outputs a read signal read from the disk 22 to the preamplifier 23 and writes a write signal output from the preamplifier 23 onto the disk 22. The preamplifier 23 performs amplification of the read and write signals and control of the heater 25. The thermistor 24 measures temperature and outputs the measurement result to the controller 12. The heater 25 adjusts the protrusion amount of an element of the head 21.

A structure of the HDD 1 will be described below.

Figure 2:
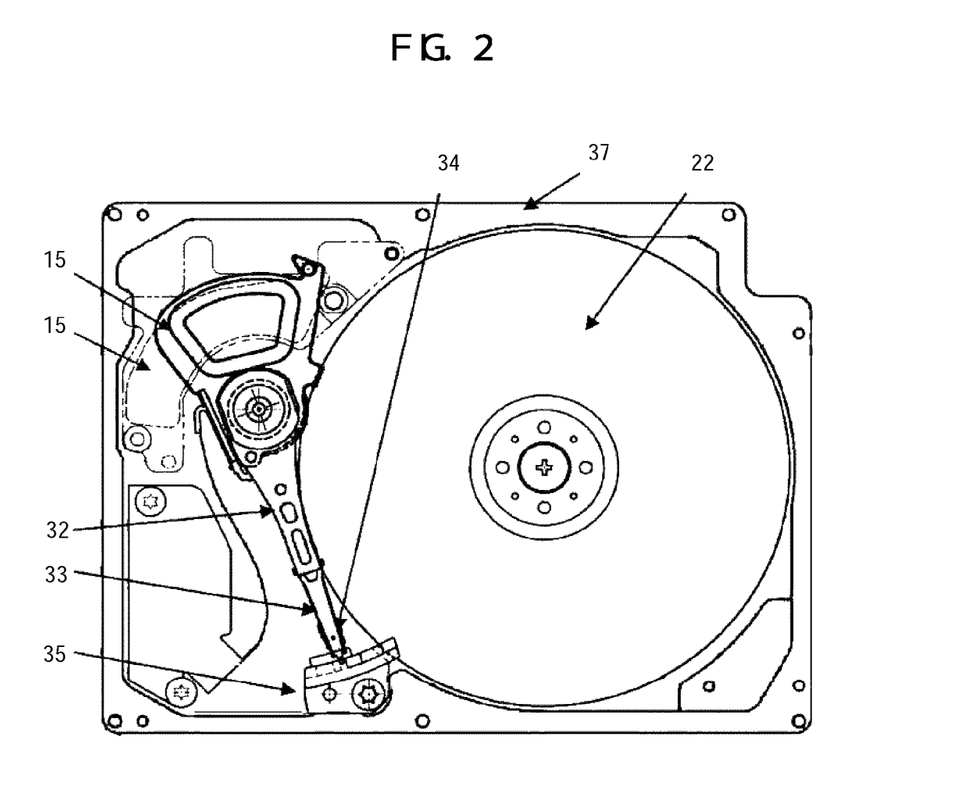
FIG. 2 is a structural view illustrating an example of a structure of the HDD according to the present embodiment.

FIG. 2 is a structural view illustrating an example of a structure of the HDD according to the present embodiment. The HDD 1 includes a disk 22, an actuator arm 32, a suspension 33, a slider 34, a ramp 35, a VCM 15, and a base 37. The actuator arm 32 supports and moves the suspension 33. The suspension 33 supports the slider 34. The slider 34 has the head 21 and is floated with respect to the disk 22. The ramp 35 is a place where the slider 34 is retracted. A magnetic circuit 36 is the VCM 15. The base 37 is a casing of the HDD 1.

Figure 3:
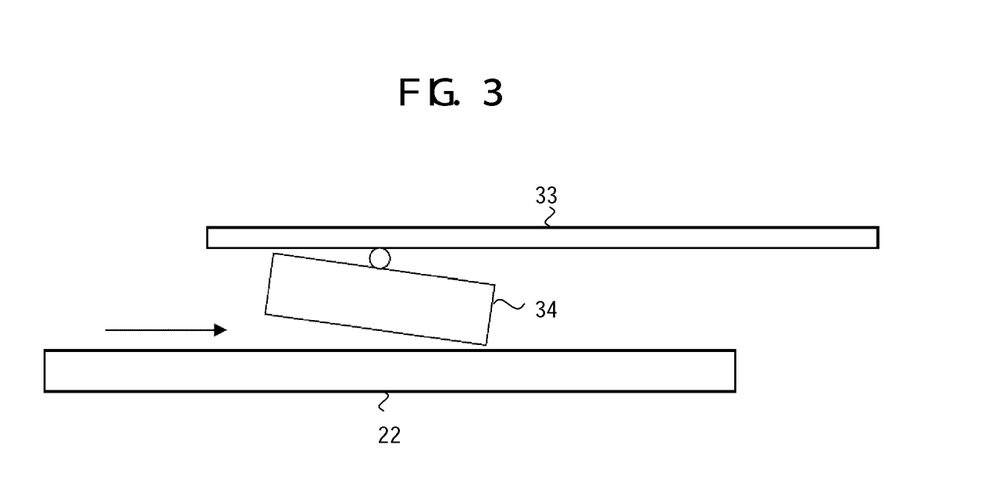
FIG. 3 is a side view schematically illustrating an example of a head floating state according to the present embodiment.

FIG. 3 is a side view schematically illustrating an example of a head floating state according to the present embodiment. The slider 34 supported by the suspension 33 is floated with respect to the disk 22 that rotates in the direction indicated by an arrow in FIG. 3.

Figure 4:
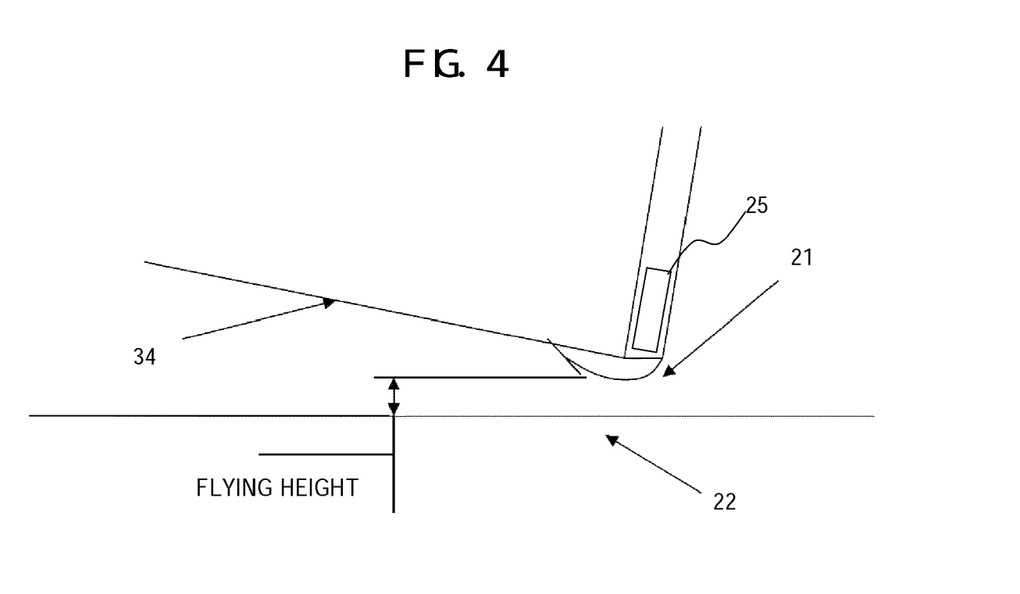
FIG. 4 is an enlarged side view illustrating the head floating state according to the present embodiment.

FIG. 4 is an enlarged side view illustrating the head floating state according to the present embodiment. The head 21 and heater 25 are provided at the distal end of the slider 34. A read/write element of the head 21 is protruded relative to the flat surface of the slider 34 due to thermal expansion caused by the heater 25. At the time when a current is not supplied to the heater 25, the height of the head 21 becomes equal to that of the flat surface of the slider 34. The controller 12 controls the supply of the current to the heater 25 in such a manner as to follow a reduction in the flying height of the slider 34 due to a reduction in pressure to adjust the degree of deformation of the head 21, thereby adjusting the distance between the head 21 and surface of the disk 22.

The slider 34 according to the present embodiment sets the flying height of the air-bearing surface thereof under a normal atmospheric pressure higher than that of a slider that does not have a heater mechanism to thereby increase a contact margin between the disk 22 and slider 34 to avoid contact between them due to a reduced atmospheric pressure.

An outline of operation of the HDD 1 will be described below.

The controller 12 utilizes a variation of a head output caused in association with a variation of the flying height of the head 21 in order to detect an atmospheric pressure variation of use environment. The controller 12 controls the heater current in accordance with the detected output of the head 21 to make the distance between the disk 22 and read/write element of the head 21 constant, enabling improvement of reduced pressure resistance. Further, in order to determine that the floating variation is due to a reduction in pressure, the controller 12 uses a temperature-originated floating variation compensation function, a disk RRO compensation function, and a vibration/impact filter to discriminate between a reduction in pressure and other environmental factors. The controller 12 calculates a servo gain of the preamplifier 23 from the output of the head 21 for each servo sector. In the present embodiment, the servo gain (flying height information) is used as a value indicating the amplitude of the output of the head 21 and flying height of the same.

The controller 12 previously sets in the heater 25 of the head 21, as a default value, an element protrusion amount and a slider flying height that assume a reduction in the flying height due to a reduction in pressure. Further, when the floating variation occurs due to a reduction in pressure, the controller 12 reduces the supply of a current to the heater so as to prevent the disk 22 and head 21 from contacting each other.

When determining, based on the head output value, that a significant floating variation occurs due to a reduction in pressure and therefore there is a possibility that the floating surface of the slider 34 may contact the disk 22 even in a state where the heater current is OFF, the controller 12 retracts (unloads) the head 21 to the ramp 35 located at a portion near the outer periphery of the disk 22 to thereby prevent contact and absorption between the disk 22 and head 21.

Similarly, in the case where a minor contact between the disk 22 and head 21 occurs under a reduced pressure environment, the controller 12 uses a feature that a head position fluctuation frequency has a unique frequency to determine the contact between the disk 22 and head 21 and performs unload of the head 21.

Further, for controlling the element height, the controller 12 not only uses an initial calibration table of each head but also feeds back temperature information from the thermistor 24 (temperature sensor, etc.) to discriminate between a head characteristic variation due to temperature and head characteristic variation due to a reduction in pressure, thereby increasing compensation accuracy.

The operation of the HDD 1 will be described in more detail below.

Initialization processing of the HDD 1 is performed in a factory. In use environment, the HDD 1 performs normal read/write processing after being subjected to adjustment processing. During the normal read/write processing, the controller 12 acquires the servo gain and head position for each servo sector and, at the same time, performs flying height control processing and head position fluctuation determination processing.

The initialization processing will be described below.

Figure 5:
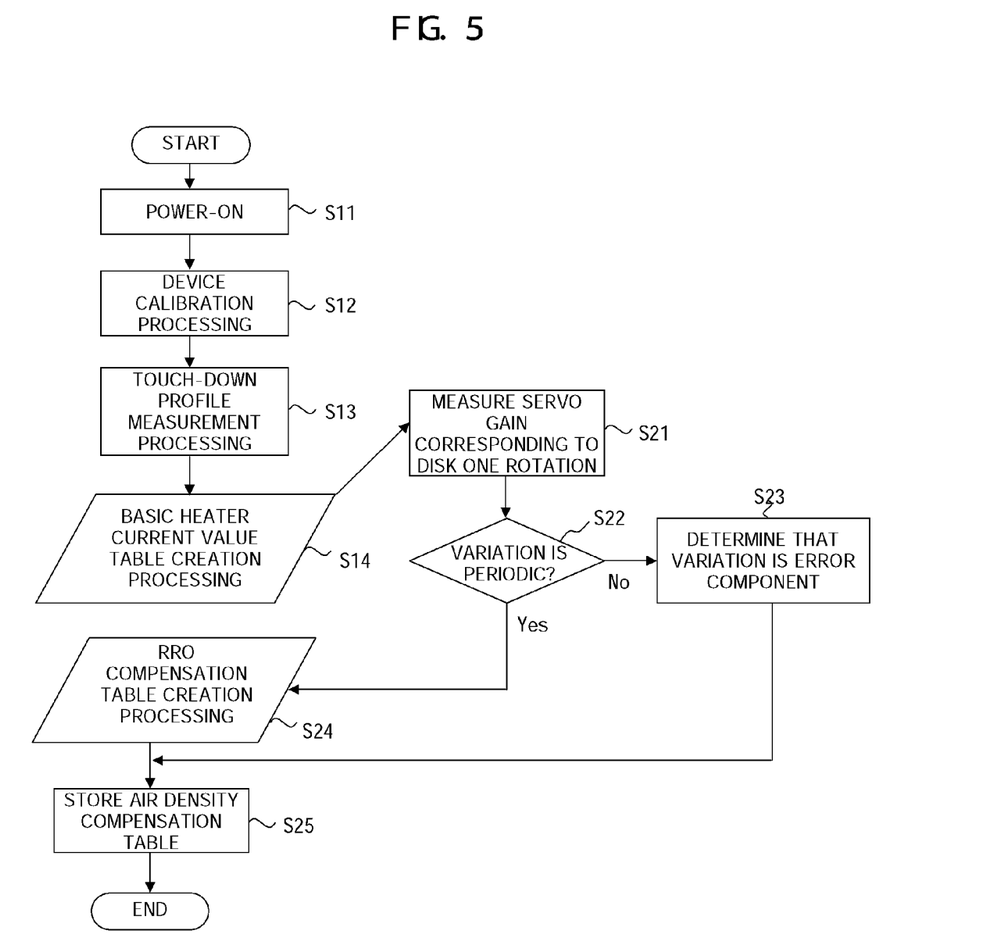
FIG. 5 is a flowchart illustrating an example of initialization processing according to the present embodiment.

FIG. 5 is a flowchart illustrating an example of the initialization processing according to the present embodiment. When a power of the HDD 1 is turned ON after completion of the assembly thereof in the factory (S11), the controller 12 performs device calibration processing (S12). In the device calibration processing, the controller 12 performs compensation of position sensitivity, external force, and head sensitivity.

The controller 12 then performs touch-down profile measurement processing to measure a touch-down profile indicating the relationship between a servo gain before head touch-down and heater current and a touch-down servo gain (S13). In the touch-down profile measurement processing, the controller 12 measures the touch-down profile at a plurality of temperature measuring points. The controller 12 then performs a basic heater current value table creation processing to create a basic heater current value table from the measured touch-down profiles (S14).

The controller 12 then measures a servo gain for each servo sector to acquire a servo gain variation corresponding to one rotation of the disk, stores the acquired result in the RAM 13 (S21) and determines whether the servo gain variation is periodic or not (S22). The controller 12 may take the average of measurement results of the servo gains corresponding to a plurality of rotations (e.g., 100 rotations).

When the servo gain variation is not periodic (No in S22), the controller 12 determines that the servo gain is Non-Repeatable Runout (NRRO) and adds this servo gain variation to the touch-down servo gain as an error component (S23).

When the servo gain variation is periodic (Yes in S22), the controller 12 determines that the servo gain variation is a floating variation due to axial RRO (Axial Repeatable Runout), creates an RRO compensation table for compensating the floating variation due to the RRO, and stores the table in a system area of the disk 22 (S24). The RRO compensation table stores a compensation value of the heater current value for each servo frame. That is, a compensation value obtained by adding the RRO to the basic heater current value is created for each servo sector in the RRO compensation table. The controller 12 can calculate adequate heater current values to be set in the heater 25 by adding the compensation values stored in the RRO compensation table to the basic heater current values.

The controller 12 then stores a previously created air density compensation table in a system area of the disk 22 (S25) and ends this flow. For creation of the air density compensation table, the servo gain is previously measured for each of a plurality of atmospheric pressure conditions. Further, the servo gain measured for each atmospheric pressure and a correction value obtained by adding a variation in the atmospheric pressure to the basic heater current value are stored as the air density correction table. The controller 12 can calculate adequate heater current values to be set in the heater 25 by adding the compensation values stored in the air density compensation table to the basic heater current values.

The touch-down profile measurement processing will be described below.

The controller 12 detects the flying height of the head 21 from a read output. In the present embodiment, the servo gain is used to detect the flying height. The controller 12 measures the servo gains starting from a heater current OFF state while increasing the heater current and stores the measurement results in the RAM 13.

Figure 6:
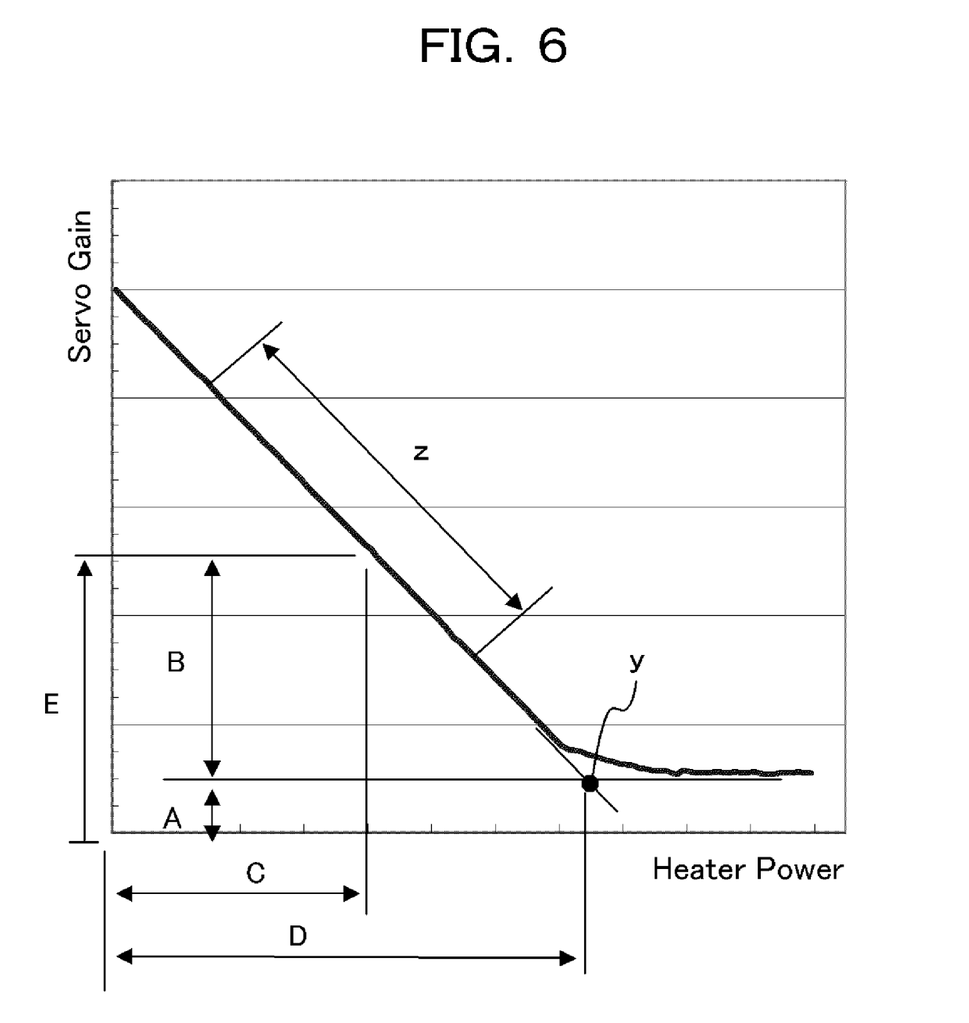
FIG. 6 is a graph illustrating an example of a touch-down profile according to the present embodiment.

FIG. 6 is a graph illustrating an example of the touch-down profile according to the present embodiment. In FIG. 6, the horizontal axis represents a heater current (heater power), and vertical axis represents a servo gain.

When the controller 12 increases the heater current, the servo gain linearly decreases. When the controller 12 further increases the heater current, the touch-down profile illustrates an inflection pointy. When the controller 12 still further increases the heater current, the servo gain approximates to a substantially constant value A. The value A is assumed to be a zero-base servo gain in terms of the flying height. The inflection point is assumed to be a touch-down position (touch-down servo gain) of the head 21 and disk 22. D in the graph of FIG. 6 denotes a touch-down heater current which is a heater current at the touch-down time.

The controller 12 calculates the floating sensitivity function of the heater 25 from the slope of an approximated straight line of a directly proportional zone z of the touch-down profile. The floating sensitivity function is an expression for calculating the heater current from the servo gain. Further, the controller 12 adds a specified flying height B to the zero-base A to calculate a servo gain E. Further, the controller 12 sets a heater current value C corresponding to the servo gain E indicating the specified flying height in the floating sensitivity function as a basic heater current value which is a heater current value for achieving the specified flying height. The servo gain can be translated into the flying height.

The controller 12 calculates heater current values for achieving the specified flying height from the floating sensitivity function as the basic heater current values and stores them in a system area of the disk 22 as a basic heater current value table.

The controller 12 measures the basic heater current value for each servo frame with respect to the circumferential direction of the disk 22. Further, the controller 12 measures the basic heater current value with respect to the radial direction of the disk 22 in three data cylinders. Thus, the controller 12 creates the basic heater current value table having basic heater current values covering the entire area of the disk 22.

Further, the controller 12 sets normal temperature Tn and high temperature Th as temperature conditions and measures the touch-down profile for each condition to create temperature-based basic heater current value tables. Further, the controller 12 uses the relationship among the basic heater current value tables of low temperature Tl, normal temperature Tn, and high temperature Th which are previously calculated by measuring a large number of other HDDs 1 to estimate a basic heater current value table of low temperature T1 from the basic heater current value tables of normal temperature Tn and high temperature Th. Further, the controller 12 may calculate a temperature characteristic interpolation coefficient from a plurality of measurement results of the temperature conditions to compensate the heater current values using the temperature characteristic interpolation coefficient and measured temperatures.

Figure 7:
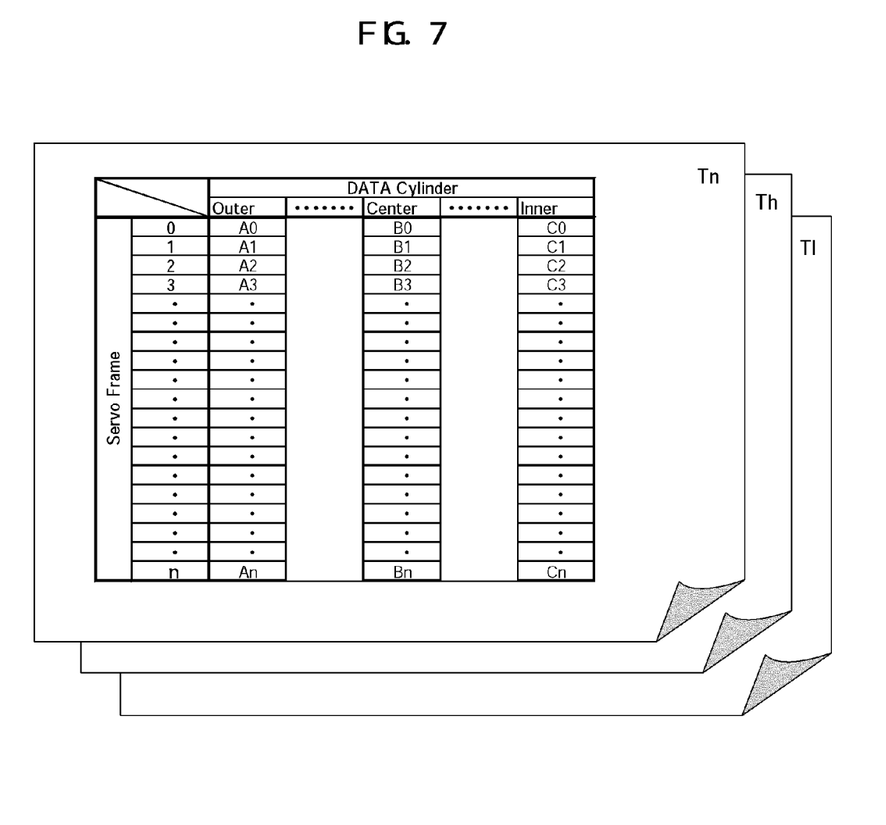
FIG. 7 is an example of the basic heater current value table according to the present embodiment.

FIG. 7 is an example of the basic heater current value table according to the present embodiment, which illustrates basic heater current value tables of normal temperature Tn, high temperature Th, and low temperature Tl. In the basic heater current value table, each row corresponds to the servo frame and each column corresponds to the data cylinder.

The controller 12 previously sets three data cylinders "Outer", "Center", and "Inner" and measures the servo gains in the three data cylinders to calculate the basic heater current values of respective columns.

The number of the basic heater current values in the circumferential direction need not coincide with the number of servo frames. Further, the number of the basic heater current values in the radial directions need not be three but may coincide with the number of zones.

The adjustment processing will be described below.

Figure 8:
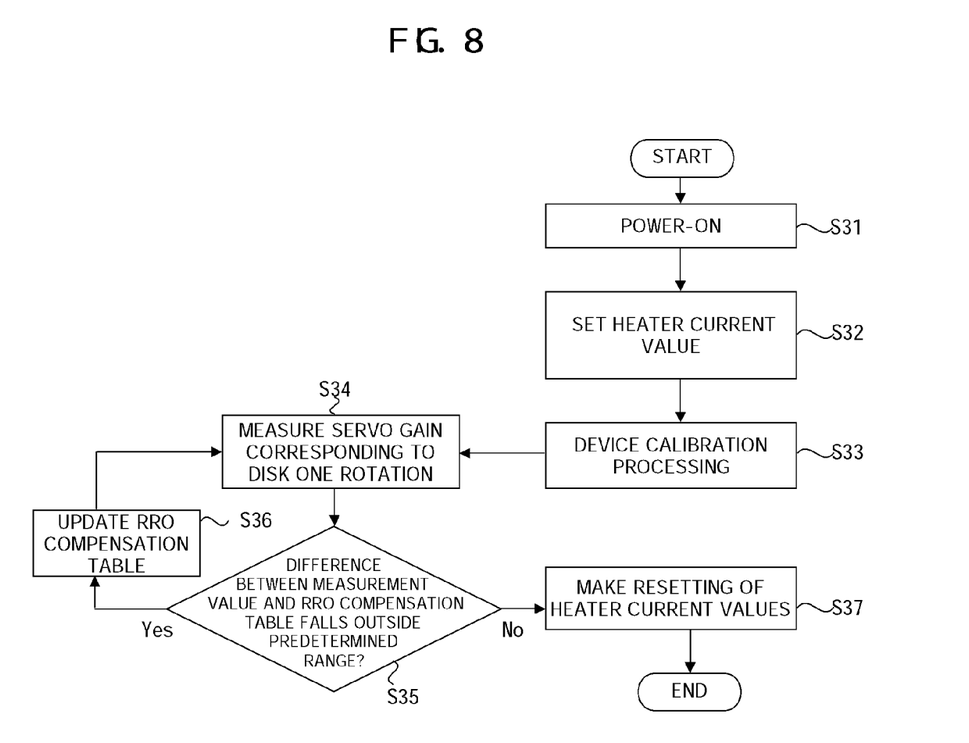
FIG. 8 is a flowchart illustrating an example of the adjustment processing according to the present embodiment.

FIG. 8 is a flowchart illustrating an example of the adjustment processing according to the present embodiment. When a power of the HDD 1 is tuned on in use environment (S31), the controller 12 loads the basic heater current value table from a system area of the disk 22 into the RAM 13 to set the basic heater current values as the heater current values of the heater 25 (S32). The controller 12 then applies linear interpolation to the basic heater current values of Outer, Center, and Inner to calculate basic current values in a desired cylinder and sets the calculated values in the heater 25.

The controller 12 then performs device calibration processing in the similar manner to step S12 (S33).

The controller 12 then measures a servo gain variation corresponding to one rotation of the disk in the similar manner to step S21 to calculate a compensation value of the heater current value and stores the calculation result in the RAM 13 (S34). The controller 12 then loads the compensation value of the RRO compensation table from the system area of the disk 22 into the RAM 13 and determines whether the difference between the compensation value of the calculation result and compensation value of the RRO compensation table falls outside a predetermined range (S35).

When the difference falls outside a predetermined range (Yes in S35), the controller 12 sets the RRO compensation table to the compensation value of the calculation result to thereby update the RRO compensation table in a system area of the disk 22 (S36).

When the difference falls within a predetermined range (No in S35), the controller 12 makes resetting of the heater current value by compensating it with use of the RRO compensation table so as to achieve the specified flying height (S37), ends this flow, and starts normal read/write processing.

Flying height control processing during the normal read/write processing will be described next.

Figure 9:
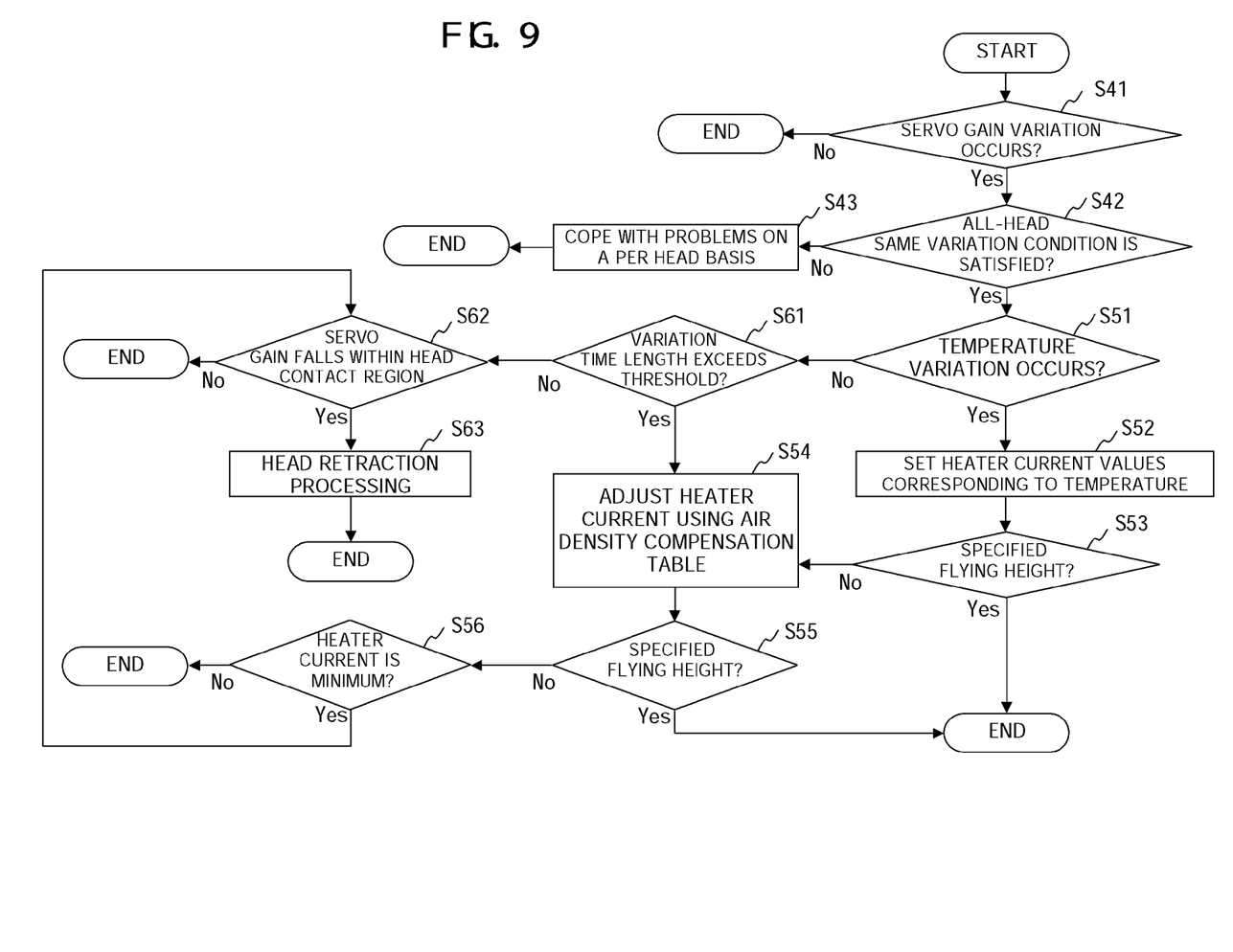
FIG. 9 is a flowchart illustrating an example of the flying height control processing according to the present embodiment.

FIG. 9 is a flowchart illustrating an example of the flying height control processing according to the present embodiment. The controller 12 determines whether a servo gain variation exceeds a predetermined servo gain variation threshold (S41). When the servo gain variation does not exceed the predetermined servo gain variation threshold (No in S41), this flow is ended. When the servo gain variation exceeds the predetermined servo gain variation threshold (Yes in S41), the controller 12 determines whether all-head same variation condition is satisfied (S42). The all-head same variation condition is a condition that the variations of the servo gains of all heads fall within a predetermined error range.

When the all-head same variation condition is not satisfied (No in S42), the controller 12 determines that a variation in the flying height is due to problems of individual heads, copes with the problems on a per head basis (S43), and ends this flow. When the all-head same variation condition is satisfied (Yes in S42), the controller 12 determines whether a temperature variation exceeds a predetermined temperature variation threshold (S51).

When the temperature variation exceeds the predetermined temperature variation threshold (Yes in S51), the controller 12 applies linear interpolation to the basic heater current values of low temperature Tl, normal temperature Tn, and high temperature Th in the basic heater current value tables to calculate heater current values corresponding to the current temperature and sets the calculated values in the heater 25 (S52). The controller 12 then determines whether the flying height becomes the specified flying height (S53).

When the flying height becomes the specified flying height (Yes in S53), this flow is ended. When the flying height does not become the specified flying height (No in S53), the controller 12 determines that the floating variation has occurred due to an atmospheric pressure variation and uses the air density compensation table to compensate the heater current values (S54). At this time, the controller 12 applies linear interpolation to the compensation values of the heater current in the air density compensation table to calculate heater current values corresponding to the current servo gain and sets the calculated values in the heater 25. The controller 12 then determines whether the flying height becomes the specified flying height (S55).

When the flying height becomes the specified flying height (Yes in S55), this flow is ended. When the flying height does not become the specified flying height (No in S55), the controller 12 determines whether the heater current value has become the minimum (S56).

When the heater current value has not become the minimum (No in S56), this flow is ended. When the heater current value has become the minimum (Yes in S56), the controller 12 shifts to step S62.

When the temperature variation does not exceed the predetermined temperature variation threshold (No in S51), the controller 12 determines whether the time length of the servo gain variation exceeds a predetermined variation time length threshold (S61). The predetermined variation time length threshold is set to, e.g., 20 ms.

When the time length of the servo gain variation exceeds the predetermined variation time length threshold (Yes in S61), the controller 12 shifts to step S54.

When the time length of the servo gain variation does not exceed the predetermined variation time length threshold (No in S61), the controller 12 determines that a servo gain variation has occurred due to vibration and determines whether the servo gain falls within a head contact region (S62).

When the servo gain does not fall within the head contact region (No in S62), this flow is ended. When the servo gain falls within a head contact region (Yes in S62), the controller 12 unloads the actuator arm to perform head retraction processing (S63), and ends this flow. In the head retraction processing, the controller 12 retracts the head 21 to the ramp 35 positioned outside the disk 22 are by means of the SVC 14 and VCM 15.

Head position fluctuation determination processing during the normal read/write operation will be described below.

Position fluctuation of the head 21 occurs under a reduced pressure. A contact unique frequency which is a unique frequency of the position fluctuation occurring when a vibration is applied to the slider 34 due to a minor contact between the disk 22 and head 21 is previously measured and set in the controller 12. In the case where the position fluctuation occurs during the normal read/write processing, the controller 12 calculates a resonance frequency from the RRO component of the position and, when the calculated resonance frequency coincides with a previously set frequency and where a reduction in the servo gain (reduction in the flying height of the head 21) is less than a predetermined value, performs the head retraction processing.

The vibration mode and vibration frequency of the position fluctuation occurring at the time when the disk 22 and head 21 contact each other are specified from the structures of the suspension 33 and actuator arm 32. Further, in order to discriminate between the position fluctuation due to a reduction in pressure and position fluctuation due to a disturbance, the controller 12 may check whether a contact between the disk 22 and head 21 has occurred or not in the flying height control processing and perform the head position fluctuation determination processing only when a contact between the disk 22 and head 21 has not been detected.

Figure 10:
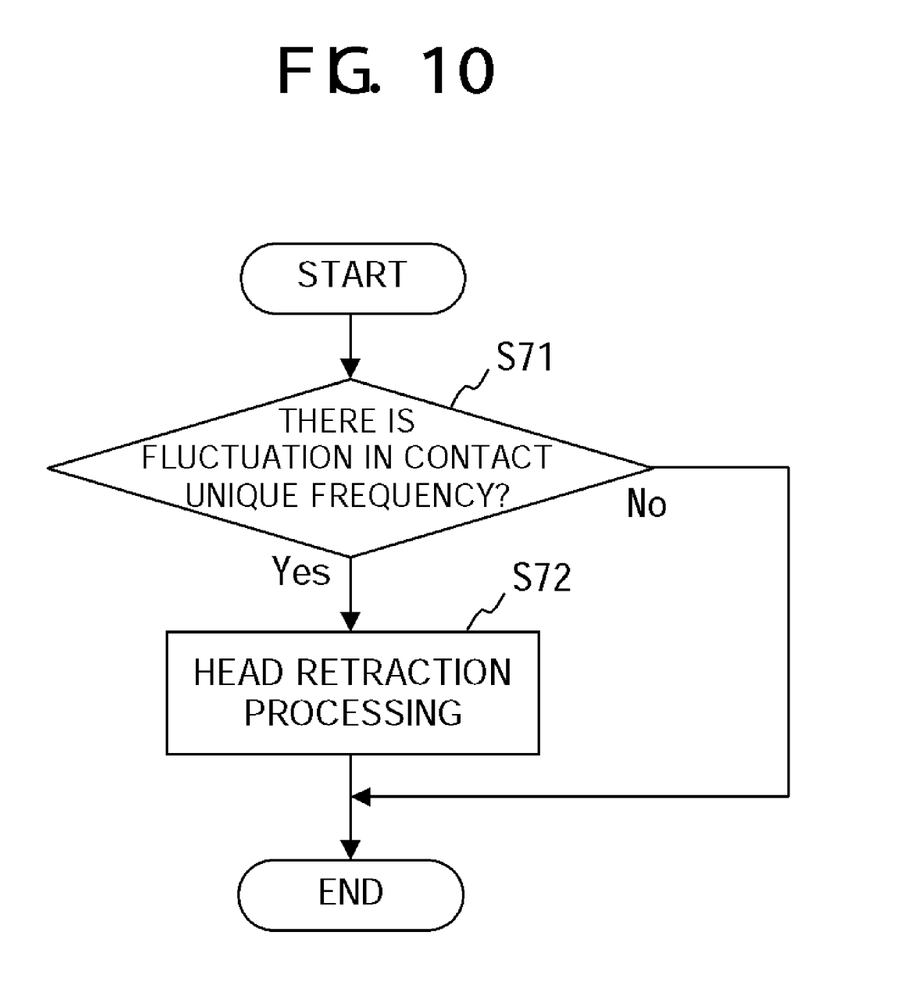
FIG. 10 is a flowchart illustrating an example of the head position fluctuation determination processing according to the present embodiment.

FIG. 10 is a flowchart illustrating an example of the head position fluctuation determination processing according to the present embodiment. The controller 12 determines whether there is a fluctuation in the contact unique frequency of the head position (S71). When there is no fluctuation in the contact unique frequency of the head position (No in S71), this flow is ended. When there is a fluctuation in the contact unique frequency of the head position (Yes in S71), the controller 12 performs the head retraction processing in the similar manner to step S63 (S72) and ends this flow.

By using the basic heater current value table and RRO compensation table, it is possible to keep the flying height of the head 22 constant under use environment at a normal atmospheric pressure. When a variation of the atmospheric pressure occurs in this state, especially when the atmospheric pressure variation is caused due to a reduction in pressure and the height of the head decreases, the controller 12 compensates the heater current using the servo gain and air density compensation table.

According to the present embodiment, by compensating, under a reduced pressure condition, a floating variation due to an atmospheric pressure variation and other factors in a discriminating manner, it is possible to increase reduced pressure resistance. As a result, it is possible to improve the environmental resistance of a magnetic disk apparatus, thereby meeting high reliability requirement.

Further, since the atmospheric pressure variation is detected using a head output and servo gain concerning the distance between the head 21 and disk 22, there is no need to additionally provide an atmospheric pressure sensor, resulting in cost reduction. Further, by detecting a reduced pressure limit from the vibration of the slider 34 caused due to a minor contact, it is possible to retract the head from above the disk to prevent absorption between the slider 34 and disk 33, thereby reducing a failure risk.

An acquisition section, a determination section, a control section, a measurement section correspond to the controller 12 in the embodiment. Control information corresponds to the basic heater current table, RRO compensation table, air density compensation table in the embodiment. Relation information corresponds to the floating sensitivity function.

According to the disclosed head control apparatus, head control method, and magnetic disk apparatus, it is possible to adequately control the height of the head even when there occurs a variation in atmospheric pressure.

The present invention can be embodied in various forms, without departing from the spirit or the main feature. Therefore, the aforementioned embodiment is merely illustrative of the invention in every aspect, and not limitative of the same. The scope of the present invention is defined by the appended claims, and is not restricted by the description herein set forth. Further, various changes and modifications to be made within the scope of the appended claims and equivalents thereof are to fall within the scope of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A head control apparatus that controls a flying height of a head with respect to a disk by controlling heater current supplied to a heater for head protrusion adjustment, comprising:
    an acquisition section that acquires flying height information concerning a variation in the flying height of the head;
    a determination section that determines whether the flying height variation is caused by a variation in atmospheric pressure based on a measured temperature and the flying height information acquired by the acquisition section; and
    a control section that controls, in the case where the determination section has determined that the flying height variation is caused by a variation in atmospheric pressure, heater current based on control information corresponding to the flying height variation caused by the atmospheric pressure variation.

2. The head control apparatus according to claim 1, further comprising a measurement section that measures relation information representing the relationship between the heater current and flying height information as well as measures the flying height information in a plurality of conditions of temperature and position on the disk and calculates a heater current for each of the plurality of conditions of temperature and position on the disk based on the measured relation information and measured flying height information so as to include the calculated heater currents in the control information.

3. The head control apparatus according to claim 2, wherein
    the measurement section measures the relation information at head touch-down time, and
    the determination section determines whether the head touch-down has occurred or not based on the relation information measured by the measurement section and flying height information acquired by the acquisition section.

4. The head control apparatus according to claim 3, wherein
    in the case where the determination section has determined that the head touch-down has occurred, the control section retracts the head to the outside of the disk.

5. The head control apparatus according to claim 2, wherein
    the measurement section calculates, based on the measured relation information and measured flying height information, a correction amount of the heater current corresponding to undulation of the disk so as to include it in the control information.

6. The head control apparatus according to claim 5, wherein
    the measurement section regards a periodic component of a variation in the measured flying height information as a variation due to the undulation of the disk and calculates a compensation amount of the heater current corresponding to the variation.

7. The head control apparatus according to claim 1, wherein
    the detection section acquires servo gains as the flying height information.

8. The head control apparatus according to claim 1, wherein
    the determination section determines that the flying height variation is caused by a variation in atmospheric pressure in the case where a variation in the measured temperature falls within a predetermined range and where the time length of a variation in the acquired flying height information exceeds a predetermined threshold.

9. The head control apparatus according to claim 1, wherein
    the control information includes a compensation amount of the heater current corresponding to an atmospheric pressure variation.

10. A head control method that controls a flying height of a head with respect to a disk by controlling heater current supplied to a heater for head protrusion adjustment, comprising:
    acquiring flying height information concerning a variation in the flying height of the head;
    measuring temperature;
    determining whether the flying height variation is caused by a variation in atmospheric pressure based on a measured temperature and the acquired flying height information; and
    controlling, in the case where it has been determined that the flying height variation is caused by a variation in atmospheric pressure, heater current based on control information corresponding to the flying height variation caused by the atmospheric pressure variation.

11. The head control method according to claim 10, further comprising measuring relation information representing the relationship between the heater current and flying height information as well as measures the flying height information in a plurality of conditions of temperature and position on the disk and calculates a heater current for each of the plurality of conditions of temperature and position on the disk based on the measured relation information and measured flying height information so as to include the calculated heater currents in the control information.

12. The head control method according to claim 11, wherein
the relation information at head touch-down time is measured, and
whether the head touch-down has occurred or not is determined based on the measured relation information and acquired flying height information.

13. The head control method according to claim 12, wherein
in the case where it is determined that the head touch-down has occurred, the head is retracted to the outside of the disk.

14. The head control method according to claim 11, wherein
based on the measured relation information and measured flying height information, a correction amount of the heater current corresponding to undulation of the disk is calculated and included in the control information.

15. The head control method according to claim 14, wherein
a periodic component of a variation in the measured flying height information is regarded as a variation due to the undulation of the disk, and a compensation amount of the heater current corresponding to the variation is calculated.

16. The head control method according to claim 10, wherein
servo gains are acquired as the flying height information.

17. The head control method according to claim 10, wherein
in the case where a variation in the measured temperature falls within a predetermined range and where the time length of a variation in the acquired flying height information exceeds a predetermined threshold, it is determined that the flying height variation is caused by a variation in atmospheric pressure.

18. The head control method according to claim 10, wherein
the control information includes a compensation amount of the heater current corresponding to an atmospheric pressure variation.

19. A magnetic disk apparatus that controls a flying height of a head with respect to a disk by controlling heater current supplied to a heater for head protrusion adjustment, comprising:
an acquisition section that acquires flying height information concerning a variation in the flying height of the head;
a temperature sensor that measures temperature;
a determination section that determines whether the flying height variation is caused by a variation in atmospheric pressure based on the temperature measured by the temperature sensor and the flying height information acquired by the acquisition section; and
a control section that controls, in the case where the determination section has determined that the flying height variation is caused by a variation in atmospheric pressure, heater current based on control information corresponding to the flying height variation caused by the atmospheric pressure variation.

* * * * *